US012575507B2

(12) United States Patent
Haaring et al.

(10) Patent No.: US 12,575,507 B2
(45) Date of Patent: Mar. 17, 2026

---

(54) INSECT NETTING FOR A GREENHOUSE

(71) Applicant: HOLLAND GAAS B.V., Maasdijk (NL)

(72) Inventors: Roland Haaring, Maasdijk (NL); Marcel Johannes Gerardus Schulte, Maasdijk (NL)

(73) Assignee: HOLLAND GAAS B.V., Maasdijk (NL)

( * ) Notice: Subject to any disclaimer, the term of this patent is extended or adjusted under 35 U.S.C. 154(b) by 39 days.

(21) Appl. No.: 18/563,370

(22) PCT Filed: May 20, 2022

(86) PCT No.: PCT/NL2022/050278
§ 371 (c)(1),
(2) Date: Nov. 21, 2023

(87) PCT Pub. No.: WO2022/245215
PCT Pub. Date: Nov. 24, 2022

(65) Prior Publication Data
US 2024/0268283 A1 Aug. 15, 2024

(30) Foreign Application Priority Data

May 21, 2021 (NL) ..................................... 2028269

(51) Int. Cl.
*A01G 9/24* (2006.01)
*E06B 9/52* (2006.01)

(52) U.S. Cl.
CPC .............. *A01G 9/241* (2013.01); *E06B 9/522* (2013.01); *E06B 2009/524* (2013.01)

(58) Field of Classification Search
CPC .......... A01G 9/241; A01G 9/24; A01G 9/242; A01G 13/21; A01G 13/22; A01G 13/24; A01G 13/31; E06B 9/522; A06B 2009/528

See application file for complete search history.

(56) References Cited

U.S. PATENT DOCUMENTS 7,568,307 B1 * 8/2009 Zimhoni .................. A01G 9/14
47/17
2006/0248807 A1 * 11/2006 Penna, IV .............. A01G 9/241
52/64

(Continued)

FOREIGN PATENT DOCUMENTS

CN      109983196 A      7/2019
EP      0811317 A2      12/1997

(Continued)

OTHER PUBLICATIONS

NL-1035203 translation (Year: 2009).*

(Continued)

*Primary Examiner* — Kristen C Hayes
(74) *Attorney, Agent, or Firm* — Westman, Champlin & Koehler, P.A.

(57) ABSTRACT

An insect netting for a greenhouse includes a front panel merging into two side panels. The insect netting is pleated having bellows sections. Each bellows section has two parallel side bellows portions and a front bellows portion. Each side bellows portion comprises a first side gauze web and a second side gauze web connected to each other at a longitudinal side thereof, each having a first short side and a second short side. Each of the front bellows portions comprises a first front gauze web and a second front gauze web connected to each other along a longitudinal side thereof. The second short side of the first and second side gauze webs of the side bellows portions is connected to the (Continued)

longitudinal side of the first and second front gauze webs facing towards the hinging axis of the ventilation panel, respectively.

21 Claims, 5 Drawing Sheets

(56)                    References Cited

U.S. PATENT DOCUMENTS

| | | | | |
|---|---|---|---|---|
| 2009/0183425 A1* | 7/2009 | Zimhoni | ............... | A01G 9/241 |
| | | | | 47/17 |
| 2016/0353677 A1* | 12/2016 | Toye | ..................... | A01G 13/27 |
| 2021/0219502 A1* | 7/2021 | Schulte | .................. | E06B 9/522 |
| 2021/0332641 A1* | 10/2021 | LaPlaca | .................. | E06B 9/522 |
| 2022/0298857 A1* | 9/2022 | LaPlaca | .................. | E06B 9/522 |
| 2023/0349230 A1* | 11/2023 | Alan | ....................... | E06B 9/522 |
| 2024/0260561 A1* | 8/2024 | Holgersson | ............ | A01G 13/10 |
| 2025/0101801 A1* | 3/2025 | Haaring | ................. | A01G 13/10 |
| 2025/0107520 A1* | 4/2025 | Almström | ............. | A01M 29/34 |

FOREIGN PATENT DOCUMENTS

| | | | | | |
|---|---|---|---|---|---|
| EP | 1182319 | A2 | * | 2/2002 | ............. A01G 9/241 |
| EP | 2631413 | A1 | | 8/2013 | |
| GB | 1251492 | A | | 10/1971 | |
| JP | 2002115475 | A | | 4/2002 | |
| KR | 2070442 | B1 | * | 1/2020 | ........... A01G 13/025 |
| NL | 9301836 | A | * | 6/1994 | ............. A01G 9/241 |
| NL | 1007720 | C2 | | 9/1999 | |
| NL | 1015820 | C2 | | 1/2002 | |
| NL | 1019229 | C2 | | 4/2003 | |
| NL | 1020536 | C2 | | 11/2003 | |
| NL | 1021836 | C2 | * | 5/2004 | ............. A01G 9/241 |
| NL | 1035203 | C2 | * | 9/2009 | .............. A01G 9/22 |
| NL | 2015156 | B1 | | 2/2017 | |

OTHER PUBLICATIONS

International Search Report and Written Opinion in corresponding International Application No. PCT/NL2022/050278 dated Sep. 1, 2022.

Office Action in corresponding Chinese Application Serial No. 202280041841.X dated Jul. 26, 2025.

* cited by examiner

INSECT NETTING FOR A GREENHOUSE

CROSS-REFERENCE TO RELATED APPLICATION

This Application is a Section 371 National Stage Application of International Application No. PCT/NL2022/050278, filed May 20, 2022 and published as WO 2022/245215 on Nov. 24, 2022, in English, the contents of which are hereby incorporated by reference in their entirety.

BACKGROUND

The invention relates to an insect netting for a greenhouse. Furthermore, the invention relates to a netting system having an insect netting, and to a greenhouse comprising an insect netting, or a netting system.

Such an insect netting is known. The known insect netting has a bellows shaped insect netting comprising a front panel that merges into two side panels, wherein the side panels have the shape of a circle section. The insect netting collapses in a stacked manner when the glass panel is swung into its closed position. The bellows sections of the side panels extend in radial direction. In the side panels, the bellows sections extend symmetrically from the front panel towards the middle to merge into each other at the ends about half the height of the side panels.

SUMMARY OF THE INVENTION

At the known insect netting, each of the two side panels and the front panel comprises a number of bellows sections. Each of the bellows sections of a first one of the two side panels merges into a bellows section of the front panel at a first corner of the insect netting, and subsequently each of the bellows sections of the front panel merges into a bellows section of the second one of the two side panels at a second corner of the insect netting. Each bellows section comprises two elongated gauze webs with a first longitudinal side along which the gauze webs are interconnected to each other in order to form the respective bellows section, and a second longitudinal side, opposite to the first longitudinal side, along which the gauze webs are interconnected to gauze webs of adjacent bellows sections.

Each of the gauze webs of the two side panels has a first end facing towards the hinging axis of the glass panel, and a second end, opposite to the first end, facing away from the hinging axis. At the second end, the gauze webs of the two side panels are interconnected to the gauze web of the front panel. In order to connect each of the gauze webs of the side panels to a corresponding one of the gauze webs of the front panel, the second end of the respective gauze web is overlapping with an end of the gauze web of the front panel, such that the second end is positioned at the longitudinal side of the gauze web of the front panel facing away from the hinging axis of the glass panel, also called the outer longitudinal side of the front panel. The gauze web of the side panel and the gauze web of the front panel by stitching along the sides of the overlapping area.

The inventors have found that a disadvantage of the known insect netting is that a glass panel at which the insect netting is provided closes unevenly. In particular, when seen in a direction perpendicular to the front panel, the glass panel or the surrounding framework thereof is warped when closed, wherein the center of the glass panel or the surrounding framework thereof is resting onto a window profile where the outer ends of the glass panel or the surrounding framework thereof are located above the window profile. This may result in broken glass panels, such that the greenhouse owner or the installer of the insect netting has to replace the broken glass panels.

Furthermore, the inventors have found that the glass panel or the surround framework thereof being warped when closed, results in undesired draught occurring at or near the outer ends of the glass panel or the surrounding framework thereof.

It is an object of the present invention to ameliorate or to eliminate one or more disadvantages of the known prior art, to provide an improved insect netting or to at least provide an alternative insect netting.

According to a first aspect, the invention provides an insect netting for a greenhouse, wherein the insect netting is configured to be secured to a ventilation panel that is hingeable around a hinging axis, wherein in an open position of the ventilation panel, the insect netting at least extends between an opening edge extending parallel to the hinging axis of the ventilation panel, and a ventilation panel edge extending parallel to the hinging axis of the ventilation panel, the insect netting comprising a front panel merging into two side panels, wherein the insect netting is pleated in a bellows configuration to collapse in a stacked manner, wherein the bellows configuration is formed with bellows sections, wherein each of the bellows sections has two parallel side bellows portions and a front bellows portion, wherein each of the side bellows portions comprises a first side gauze web and a second side gauze web connected to each other at a longitudinal side thereof and each having a first short side configured for facing towards the hinging axis, and a second short side, opposite to the first web end, configured for facing away from the hinging axis, wherein each of the front bellows portions comprises a first front gauze web and a second front gauze web connected to each other a longitudinal side thereof, and wherein the second short side of the first and second side gauze webs of the side bellows portions is connected to the longitudinal side of the first and second front gauze webs facing towards the hinging axis of the ventilation panel, respectively.

The insect netting according to the invention, thus, has a number of bellows sections. Each bellows section has two parallel side bellows portions and a front bellows portions. Each of the side bellows portions has a first side end configured to be facing towards a hinging axis of a ventilation panel, and a second side end configured to be facing away from the hinging axis of the ventilation panel, when the insect netting is installed in a greenhouse. The second side end of the side bellows portions is connected to the longitudinal side of the front bellows portion, in particular the front web gauzes thereof, that is facing towards the hinging axis, when the insect netting is installed in the greenhouse. The front gauze webs may be connected to each other at the longitudinal side thereof that is facing away from the hinging axis of the ventilation panel, for example by stitching. By connecting the second side end of the side gauze webs to the longitudinal side of the front gauze webs facing towards the hinging axis, the amount of overlap between the side gauze webs and the front gauze webs is reduced to a minimum. It, therewith, is prevented that multiple stitchings are placed on top of each other, as is this case in the known insect netting. As a result, the thickness of the insect netting at the mergers from the side bellows portions to the front bellows portions is reduced in comparison with the known insect netting. The inventors have surprisingly found that a reduced thickness at the mergers from the side bellows portions to the front bellows portions results advantageously in a reduced or in the ideal case eliminated warp of the ventilation panel, when the ventilation panel is in the closed position.

Additionally, the reduced thickness of the insect netting at the mergers from the side bellows portions to the front bellows portions may result in that the framework surrounding the glass panel is resting onto a window profile over its complete width, when seen in a direction perpendicular to the front panel. Advantageously, this may reduce or in the ideal case eliminate draught occurring at or near the outer ends of the glass panel or the surrounding framework thereof.

Furthermore, the reduced thickness of the insect netting at the mergers from the side bellows portions to the front bellows portions may result in a reduced loss of light in comparison to the insect netting according to the prior art.

In the context of the present patent application, a ventilation panel has to be understood to be selected from a group including, but not limited to, a tempered glass panel, a glass panel, an ETF foil, a honeycomb panel, a polycarbonate panel, a sandwich panel, or a combination thereof.

In an embodiment, each of the first and second front gauze webs has a first web end and a second web end, opposite to the first web end in the longitudinal direction thereof, wherein the second short side of the first and second side gauze webs of the side bellows portions is connected to the longitudinal side of the first and second front gauze webs facing towards the hinging axis of the ventilation panel, respectively, at or near the first or second web end thereof.

In an embodiment, the first and second front gauze webs are connected to each other at the first and second web ends thereof. By closing the first and second web ends of the front bellows portions, the insect netting is closed completely such that it prevents insects from entering or leaving a greenhouse via a ventilation opening associated with the ventilation panel.

In an embodiment, the second short side of the first and second side gauze webs of the side bellows portions is fused to the longitudinal side of the first and second front gauze webs facing towards the hinging axis of the ventilation panel, respectively. In an alternative embodiment, the second short side of the first and second side gauze webs of the side bellows portions is welded to the longitudinal side of the first and second front gauze webs facing towards the hinging axis of the ventilation panel, respectively. By welding or fusing the side gauze webs to the front gauze webs, the side gauze webs and the front gauze webs melt together at least partially. This is advantageous, as the thickness of the bellows section is kept to a minimum at the position where the side gauze webs and the front gauze webs meet.

In an embodiment, the second short side of the first and second side gauze webs of the side bellows portions is stitched to the longitudinal side of the first and second front gauze webs facing towards the hinging axis of the ventilation panel, respectively.

In an embodiment, the longitudinal side of the first and second front gauze web facing away from the hinging axis, is spaced apart from the first and second web end of the first and second side gauze web, respectively.

In an embodiment, the longitudinal side of the first and second front gauze webs facing away from the hinging axis is free from the first and second side gauze webs.

In an embodiment, the gauze webs of the web sections are connected to each other at a first longitudinal side thereof, and wherein the web sections are connected to each other at a second longitudinal side, opposite to the first longitudinal side, of the gauze webs.

In an embodiment, the gauze webs comprise a woven textile with warp threads and crossing weft threads that alternatingly go over and under the consecutive warp threads, wherein the warp threads and the weft threads each comprise at least one strand.

In an embodiment, the strand is formed with a plastic resin or fiberglass.

In an embodiment, the plastic resin is a polyolefin.

In an embodiment, the plastic resin is polyethylene, polypropylene or polyester.

In an embodiment, at least one of the side panels has a substantially triangular shape, when the ventilation panel is in the open position. In an embodiment thereof, mating ends of a pair of bellows sections facing away from the front panel are located further away from the front panel than mating ends of a further pair of bellows sections facing away from the front panel, wherein the further pair of bellows sections is located between the pair of bellows sections.

In an embodiment, the side panels comprise an outermost bellows section and multiple intermediate bellows sections that are connected to each other along longitudinal inner edges of their gauze webs, wherein the bellows sections all have their front side merging into the front panel, wherein of each intermediate bellows section the gauze webs are connected to each other at the opposite back end, wherein the opposite back end of the outermost bellows section is configured to be located at or close to the hinging axis, and wherein the back ends of the consecutive intermediate bellows sections are adjacent to and spread along the outermost bellows section.

According to a second aspect, the invention provides a netting system for a greenhouse, wherein the netting system comprises a framework for securing the netting system to a ventilation panel that is hingeable around a hinging axis, and an insect netting according to the first aspect of the invention.

The netting system according to the invention has at least the same technical advantages as described in relation to the insect netting according to the first aspect of the invention.

In an embodiment, the insect netting is secured to the framework by means of stitching, in particular to a stitching web that is oriented downwards from the framework. The stitching web, for example, may be made of rubber, EPDM, or the like.

In the context of the application, it has to be understood that the insect netting and the netting system each are also suitable to used at sales areas, stables, garden centers, etc.

According to a third aspect, the invention provides a greenhouse, wherein the greenhouse comprises a roof construction having a slanting upper surface with an opening and a rectangular glass panel that covers the opening, wherein at its upper edge the glass panel is hingeably connected with a part of the roof construction to hinge around a hinging axis between a closed position in which the glass panel extends substantially parallel to the upper surface and an open position in which the glass panel is oriented oblique with respect to the upper surface to form a ventilation passage, wherein the greenhouse further comprises an insect netting according to the first aspect of the invention, or a netting system according to the second aspect of the invention.

The greenhouse according to the invention has at least the same technical advantages as described in relation to the insect netting according to the first aspect of the invention.

According to a fourth aspect, the invention provides a method for manufacturing bellows sections for an insect netting according to the first aspect of the invention, the method comprising the steps of:

providing two or more side gauze webs and two or more front gauze webs;

connecting two side gauze webs to each other along a longitudinal side thereof;

connecting two front gauze webs to each other along a longitudinal side thereof; and securing the two connected gauze webs to the two connected front gauze webs by arranging and connecting the second short side of the side gauze webs at and to the longitudinal side of the front gauze webs that is configured to face towards a hinging axis of a ventilation panel during use.

The method according to the invention has at least the same technical advantages as described in relation to the insect netting according to the first aspect of the invention.

In an embodiment, the side gauze webs are connected to the front gauze webs by means of welding, fusing or stitching.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
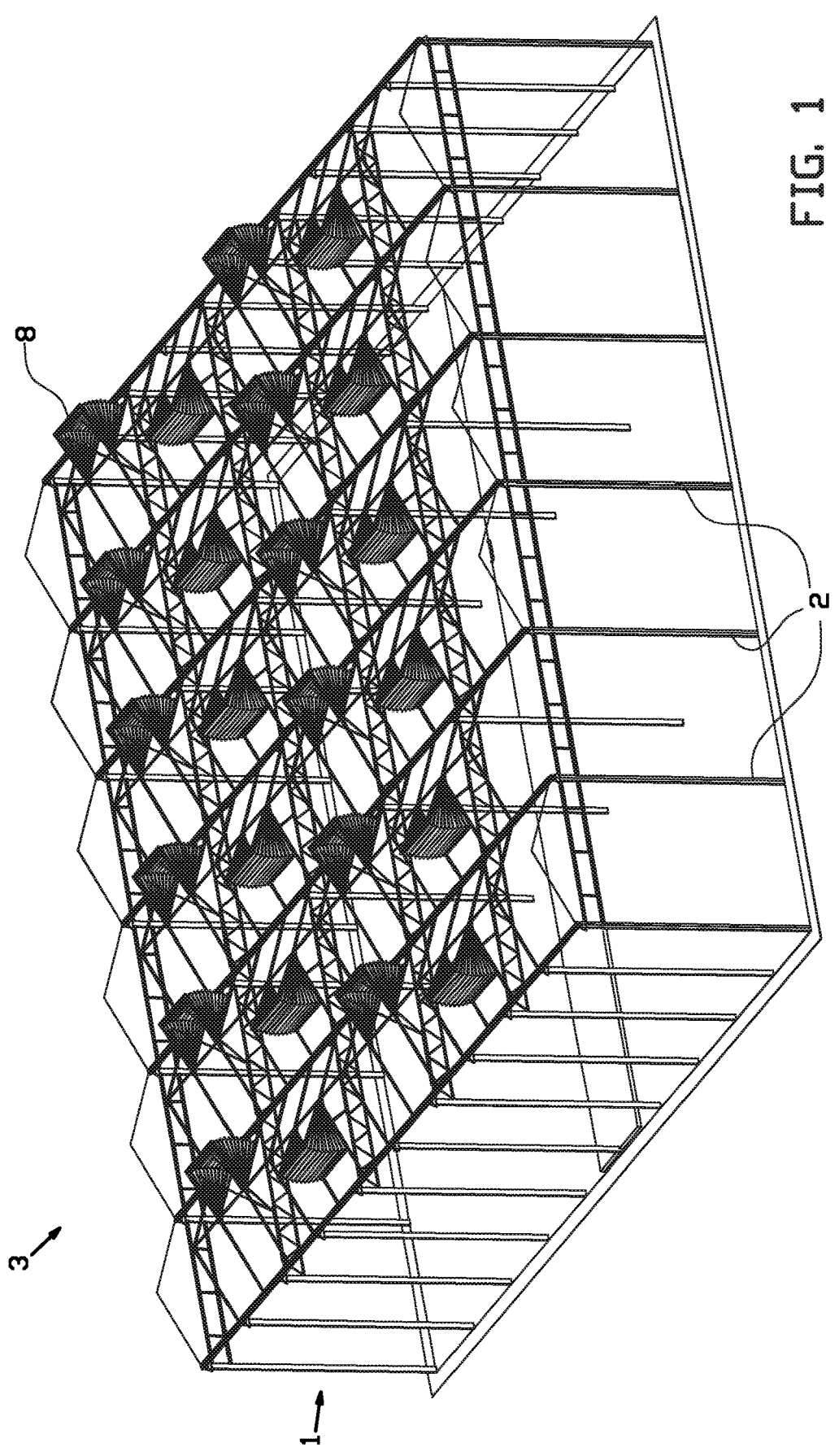
FIG. 1 is an isometric view of a greenhouse with a roof construction having glass panels with a netting system having an insect netting.
Figure 2:
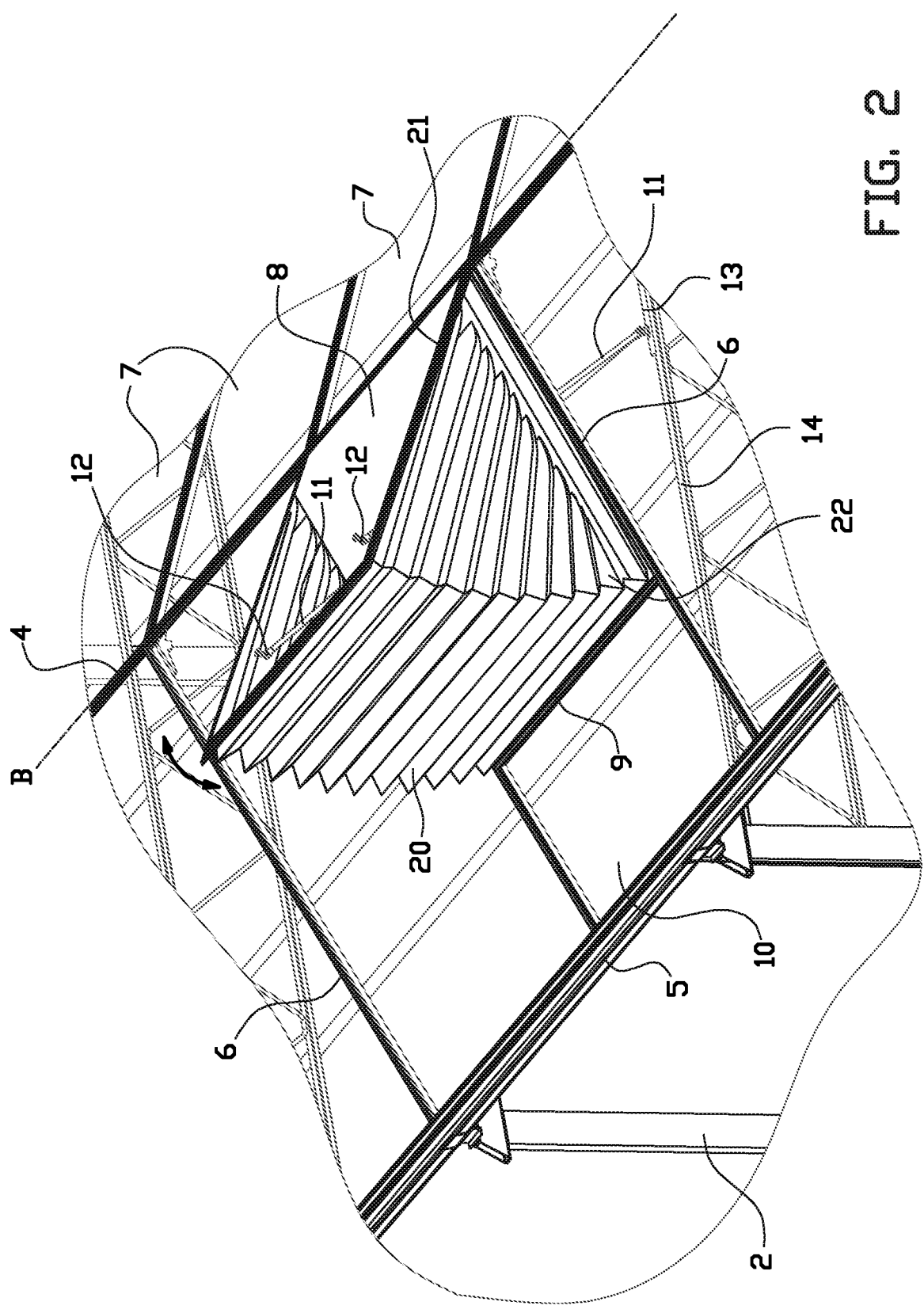
FIG. 2 is an isometric view of one of the glass panels with the netting system having a front panel of FIG. 1.

A greenhouse 1 of the Venlo type is shown in FIGS. 1 and 2. The greenhouse 1 comprises multiple rows of vertical columns 2 for supporting a roof construction 3. The roof construction 3 includes a framework with multiple parallel roof ridge profiles 4 and lower rain gutter profiles 5. Adjacent roof ridge profiles 4 and rain gutter profiles 5 are connected to each other by means of slanting window profiles 6. The roof ridge profiles 4, the rain gutter profiles 5 and the window profiles 6 are made of a metal, in particular aluminum, and form rectangular rabbets for fixed glass panels 7.

The roof construction 3 further includes a number of regularly distributed glass panels 8, such as tempered glass panels 8, also called ventilation panels. Each of the glass panels 8 is hingeably connected to the adjacent roof ridge profile 4 at the upper side thereof. The glass panels 8 are transparent in order to allow light to enter the greenhouse 1. As shown in FIG. 2, the glass panels 8 are shorter than the fixed glass panels 7. A horizontal window profile 9 is provided between two adjacent slanting window profiles 6 in order to form a rabbet for an additional, smaller glass panel 10 below the glass panel 8.

As shown in FIG. 2, the glass panel 8 is configured to hinge around the hinge axis B between the shown open position and a closed position in order to regulate the ventilation of the greenhouse 1. The greenhouse 1 is provided with pushing rods 11 connected to distributed connections 12 within the tempered glass panel 8, which pushing rods 11 are coupled to a slide 13 that my move along a horizontal rail 14 by means of an electromotor, in order to move the tempered glass panel 8 into the open or closed position thereof.

Each of the glass panels 8 is provided with a netting system 20 to prevent passage of insects when the glass panel 8 is in the open position. These can be harmful insects that have to be kept outside the greenhouse 1 or specific insects that are held inside the greenhouse 1. The netting system 20 comprises a framework 21 arranged along the free edges of the glass panel 8, and an insect netting 22 of fine mesh gauze. When the glass panel 8 is in the closed position, the framework 21 rests on the horizontal window profile 9 and the adjacent slanting window profiles 6. The insect netting is pleated in a bellows configuration in order to stack when it collapses. The insect netting 22 is connected with the framework 21 at the upper side thereof, for example by stitching the insect netting 22 to a non-shown stitching web that is oriented downwards from the framework 21. The stitching web may be manufactured from rubber, EPDM or the like, and at the lower side the insect netting 22 is connected to the corresponding horizontal window profile 6 and the slanting window profiles 6 along the ventilation opening.

Figure 3:
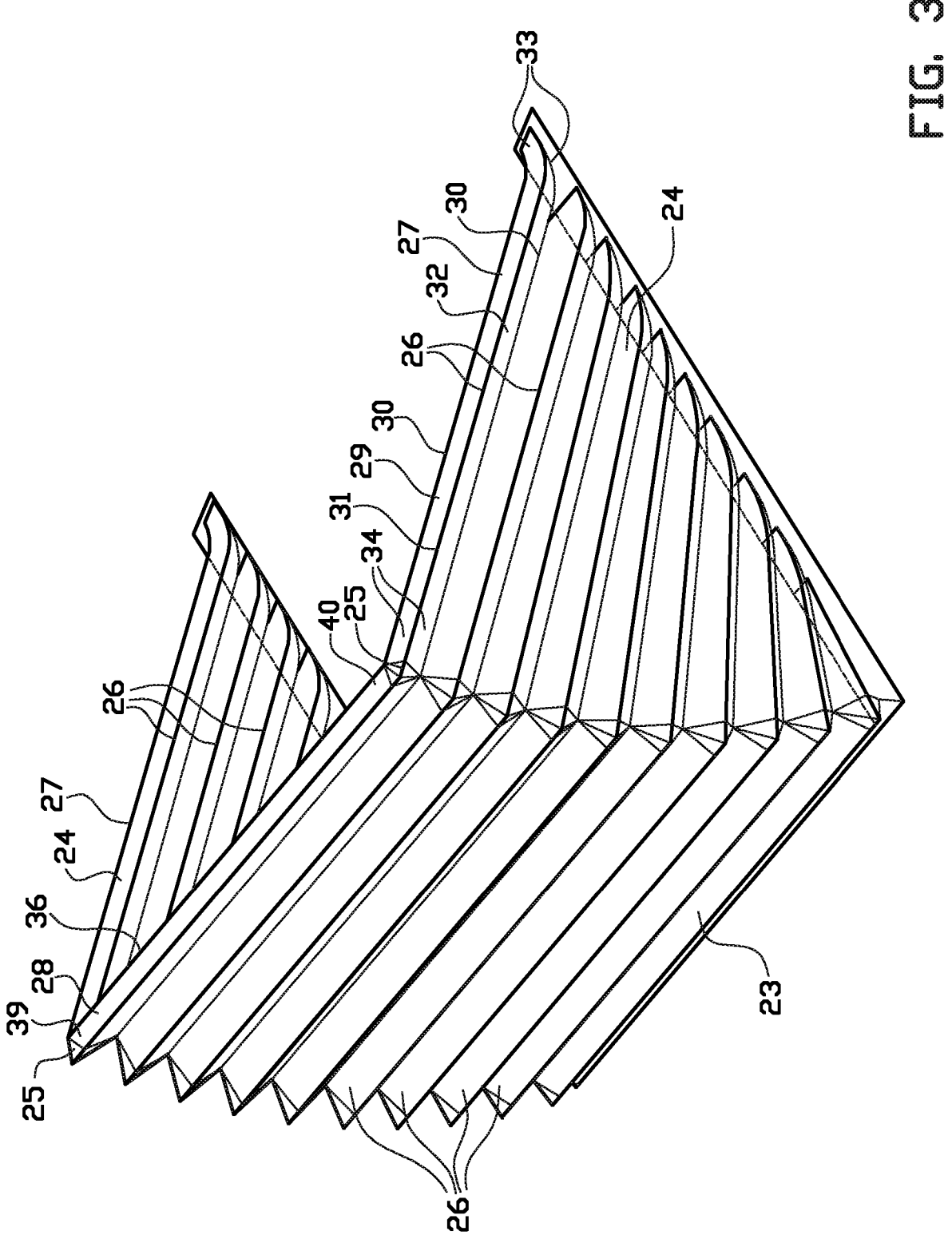
FIG. 3 is a more detailed view of the insect netting of the netting system of FIG. 2.

The insect netting 22, without the framework 21, is shown in FIG. 3. The insect netting 22 comprises a front panel 23 and two parallel side panels 24. The two parallel side panels 24 merge into the front panel 23 at a straight corner 25. When the insect netting 22 is arranged at a glass panel 8, the two parallel side panels 24 extend substantially transverse or transverse to the hinging axis B of the respective glass panel 8.

As shown in FIG. 3, the two parallel side panels 24 and the front panel 23 comprise a number of bellows sections 26 arranged above each other in order to form the pleated configuration of the insect netting. Each bellows section 26 has two parallel side bellows portions 27 and a front bellows portion 28. Each of the two parallel side bellows portions 27 has a first side gauze web 29 with a first longitudinal side 30 and a second longitudinal side 31, opposite to the first longitudinal side 30, and a second side gauze web 32 also with a first longitudinal side 30 and a second longitudinal side 31, opposite to the first longitudinal side 30. The first and second side gauze webs 29, 32 are connected to each other along the second longitudinal side 31 thereof, for example by means of stitching. Furthermore, each of the first and second side gauze webs 29, 32 comprises a first web end 33, also called first short side, facing towards the hinging axis B of the glass panel 8, and a second web end 34, also called second short side, facing away from the hinging axis B of the glass panel 8 and towards the front panel 23.

Each of the front bellows portions 28 has a first front gauze web 35 with a first longitudinal side 36 and a second longitudinal side 37, opposite to the first longitudinal side 36, and a second front gauze web 38 also with a first longitudinal side 36 and a second longitudinal side 37, opposite to the first longitudinal side 36. The first and second front gauze webs 35, 38 are connected to each other along the second longitudinal side 37 thereof, for example by means of stitching. Furthermore, each of the first and second front gauze webs 35, 37 comprises a first web end 39, facing one of the two parallel side panels 24, and a second web end 40, facing towards the other one of the two parallel side panels 24.

Figure 4:
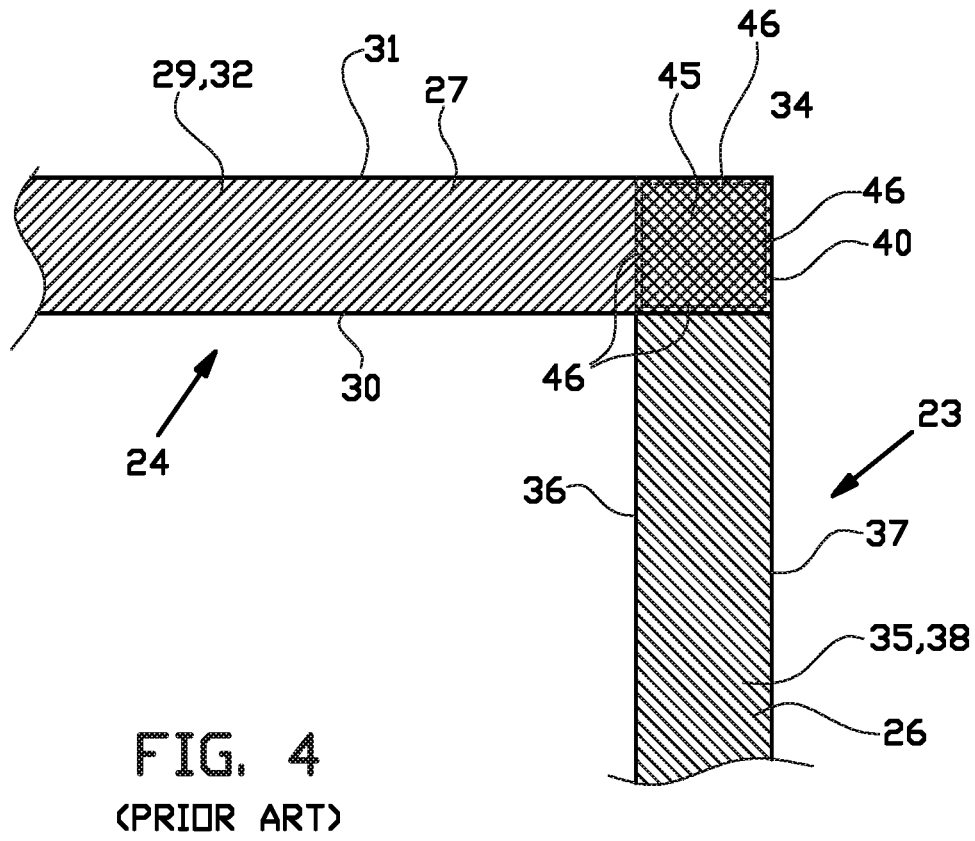
FIG. 4 shows a detail of the insect netting of FIG. 3 according to prior art.
Figure 5:
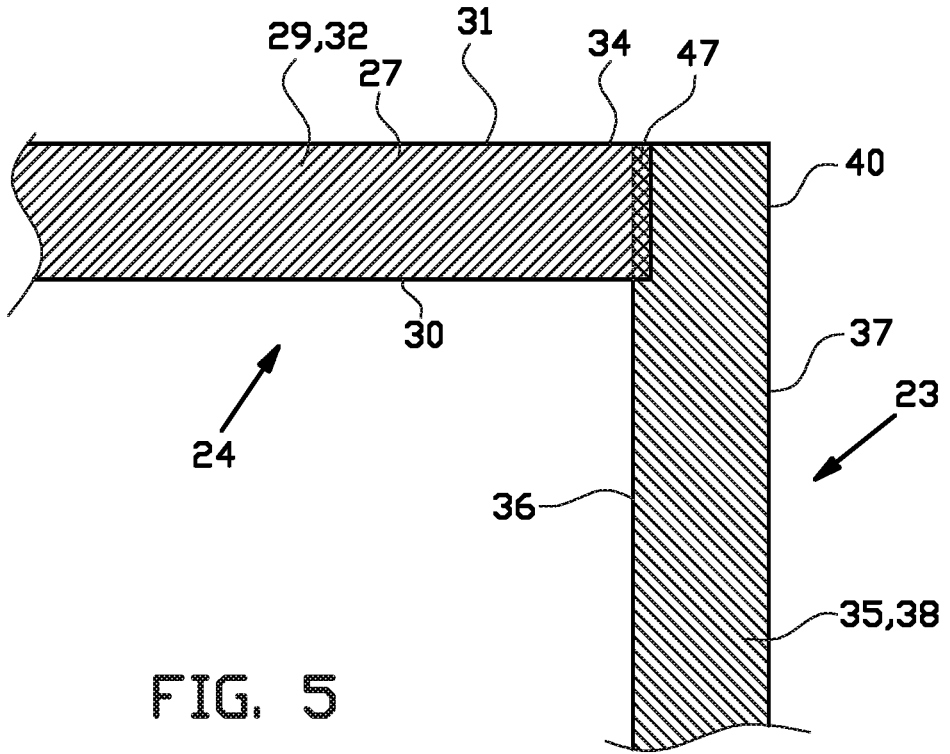
FIG. 5 shows a detail of the insect netting of FIG. 3 according to an embodiment of the invention.

The front bellows portions 26 and the two side bellows portions 27 are connected to each other by connecting the first side gauze web 29 of the side bellows portions 27 to the first front gauze web 35 of the front bellows portions 26, and by connecting the second side gauze web 32 of the side bellows portions 27 to the second front gauze web 38 of the front bellows portions 26, as is elucidated in more detail in relation to FIGS. 4 and 5.

In FIG. 4, it is shown how the side gauze webs 29, 32 of the side bellows portions 27 are connected to the front gauze webs 35, 38 of the front bellows portions 26 according to the prior art. As shown in FIG. 4, the second web end 34, or the second short side, of the side gauze webs 29, 32 of the side bellows portions 27 is placed on top of the second web end 40 of the front gauze webs 35, 38, or the second web end 40 of the front gauze webs 35, 38 is placed on top of the second web end 34 of the side bellows portions 27, therewith realizing an overlapping area 45. As clearly shown, the second web end 34, or the second short side of the side gauze webs 29, 32 is located on or at the second longitudinal side 37 of the front gauze webs 35, 38, i.e. the longitudinal side of the front gauze webs facing away from the hinging axis B of the glass panel 8. The same is applicable to the first web end 39 of the front gauze webs 35, 38. Subsequently, the side gauze webs 29, 32 are stitched to the front gauze webs 35, 38 by means of stitchings 46 along the outer edges of the overlapping area 45.

In FIG. 5, it is shown how the side gauze webs 29, 32 of the side bellows portions 27 are connected to the front gauze webs 35, 38 of the front bellows portions 26 according to an embodiment of the invention. As is clearly shown in FIG. 5, the second web end 34, or the second short side, of the side gauze webs 29, 32 of the side bellows portions 27 is connected to the first longitudinal side 36 of the front gauze webs 35, 38, i.e. the longitudinal side of the front gauze webs 35, 38 facing towards the hinging axis B of the glass panel 8, at or near the second web end 40 of the front gauze webs 35, 38. In particular, the second web end 34 of the side gauze webs 29, 32 of the side bellows portions 27 is spaced apart from the second longitudinal side 37 of the of the front gauze webs 35, 38, i.e. the longitudinal side of the front gauze webs 35, 38 facing away from the hinging axis B of the glass panel 8. The side gauze webs 29, 32 are interconnected to the front gauze webs 35, 38 by means of welding, therewith forming a welding area 47. As clearly shown in FIG. 5, the first and second web ends 39, 40 of the front gauze webs 35, 38 are connected to each other, for example by means of welding, in order to form front bellows section 28 with closed ends.

Due to the side gauze webs 29, 32 and the front gauze webs 35, 38 being interconnected by means of welding, the thickness of the bellows sections 26 at the merger of the side bellows portions 27 into the front bellows portion 28 is decreased in comparison with the thickness of the bellows sections 26 at the merger of the side bellows portions 27 into the front bellows portion 28 of the insect netting 22 according to the prior art as shown in FIG. 4. This is advantageous, as this results in that the glass panel 8 is enabled to close evenly, such that the framework 21 lies evenly on the horizontal window profile 9.

Additionally, ventilation at the mergers of the side gauze webs 29, 32 of the side bellows portions 27 to the front gauze webs 35, 38 of the front bellows portions 26 may be improved due to less overlap of the gauze webs 29, 32; 35, 38 at the mergers in comparison to the prior art.

Figures 6, 7:
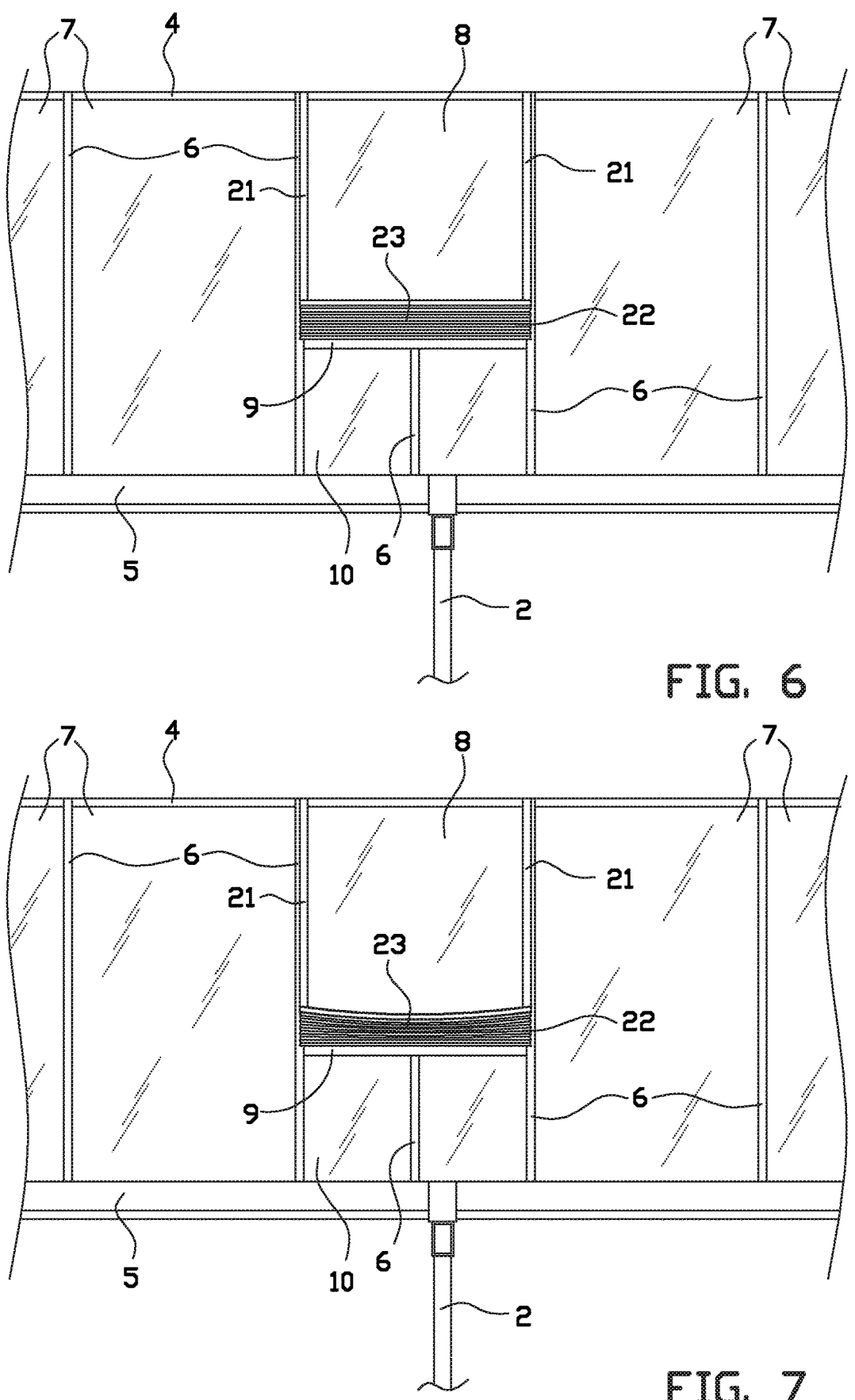
FIG. 6 shows a front view in a direction perpendicular to the front panel of the glass panel of FIG. 2 with a netting system according to an embodiment of the invention.
FIG. 7 shows a front view in a direction perpendicular to the front panel of the glass panel of FIG. 2 with a netting system according to the prior art.

In order to illustrate a result of the insect netting 22 according to the invention, a comparison is made between a glass panel 8 in closed position with an insect netting according to an embodiment of the invention, FIG. 6, and with an insect netting according to the prior art, FIG. 7. It is clearly shown in FIG. 7 that at least the front portion of the framework 21 parallel to the front panel 23 of the insect netting 22 is warped with respect to the underlying horizontal window profile 9. In particular, the centre of the front portion of the framework 21 is situated closer to the underlying horizontal window profile 9 than the outer ends of the front portion of the framework 21. Warping of the front portion of the framework 21 is caused by the insect netting having a greater thickness at the mergers in comparison to the remaining of the insect netting 22. This is disadvantageous as elucidated above. As a result, one or more intermediate slanting window profiles 6 located between outer slanting window profiles 6 at which the framework 21 rests when in closed position, are not under load by the glass panel 8. All load applied by the glass panel 8, via the framework 21, is absorbed by the outer slanting window profiles 6 and the underlying horizontal window profile 9.

As shown in FIG. 6, the front portion of the framework 21 is substantially parallel to the underlying horizontal window profile 9. As a result, all load applied by the glass panel 8, via the framework 21, is absorbed by the outer slanting window profiles 6, the underlying horizontal window profile 9 and also the one or more intermediates slanting window profiles. The one or more intermediate slanting window profiles, therefore, are also under a load when the glass panel 8 is in its closed position.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An insect netting for a greenhouse, wherein the insect netting is in a pleated configuration configured to be secured to a ventilation panel that is hingeably connected with a part of a roof construction to hinge around a hinging axis between a closed position in which the ventilation panel extends substantially parallel to an upper surface of the roof construction and an open position in which a glass panel is oriented oblique with respect to the upper surface, wherein in an open position of the ventilation panel, the insect netting is configured to at least extend between an opening edge extending parallel to the hinging axis of the ventilation panel, and a ventilation panel edge extending parallel to the hinging axis of the ventilation panel, the insect netting comprising a front panel merging into two side panels, wherein the pleated configuration of the insect netting is configured to collapse in a stacked manner, wherein the pleated configuration is formed with pleated sections comprising two parallel side pleated portions and a front pleated portion, wherein each of the side pleated portions comprises a first side gauze web and a second side gauze web connected to each other at a longitudinal side thereof and each having a first short side configured for facing towards the hinging axis, and a second short side, opposite to the first short side, configured for facing away from the hinging axis, wherein the front pleated portion comprises a first front gauze web and a second front gauze web connected to each other along a longitudinal side thereof, and wherein the second short side of the first and second side gauze webs of the side pleated portions is connected to the longitudinal side of the first and second front gauze webs facing towards the hinging axis of the ventilation panel, respectively.

2. The insect netting according to claim 1, wherein each of the first and second front gauze webs has a first web end and a second web end, opposite to the first web end in a longitudinal direction thereof, wherein the second short side of the first and second side gauze webs of the side pleated portions is connected to the longitudinal side of the first and second front gauze webs facing towards the hinging axis of the ventilation panel, respectively, at or near the first or second web end thereof.

3. The insect netting according to claim 2, wherein the first and second front gauze webs are connected to each other at the first and second web ends thereof.

4. The insect netting according to claim 1, wherein the second short side of the first and second side gauze webs of the side pleated portions is fused to the longitudinal side of the first and second front gauze webs facing towards the hinging axis of the ventilation panel, respectively.

5. The insect netting according to claim 1, wherein the second short side of the first and second side gauze webs of the side pleated portions is welded to the longitudinal side of the first and second front gauze webs facing towards the hinging axis of the ventilation panel, respectively.

6. The insect netting according to claim 1, wherein the second short side of the first and second side gauze webs of the side pleated portions is stitched to the longitudinal side of the first and second front gauze webs facing towards the hinging axis of the ventilation panel, respectively.

7. The insect netting according to claim 1, wherein the longitudinal side of the first and second front gauze webs facing away from the hinging axis, is spaced apart from the first and second web end of the first and second side gauze webs, respectively.

8. The insect netting according to claim 1, wherein the longitudinal side of the first and second front gauze webs facing away from the hinging axis is free from the first and second side gauze webs.

9. The insect netting according to claim 1, wherein the first and second front gauze webs are connected to each other at a first longitudinal side thereof, and wherein the side pleated portions are connected to the front pleated portion at a second longitudinal side, opposite to the first longitudinal side, of the first and second front gauze webs.

10. The insect netting according to claim 1, wherein each of the first and second side gauze webs and each of the first and second front gauze webs comprise a woven textile with warp threads and crossing weft threads that alternatingly go over and under consecutive warp threads, wherein the warp threads and the weft threads each comprise at least one strand.

11. The insect netting according to claim 10, wherein the strand is formed with a plastic resin or fiberglass.

12. The insect netting according to claim 11, wherein the plastic resin is a polyolefin.

13. The insect netting according to claim 11, wherein the plastic resin is polyethylene, polypropylene or polyester.

14. The insect netting according to claim 1, wherein at least one of the side panels has a substantially triangular shape, when the ventilation panel is in the open position.

15. The insect netting according to claim 14, wherein mating ends of a pair of pleated sections facing away from the front panel are located further away from the front panel than mating ends of a further pair of pleated sections facing away from the front panel, wherein the further pair of pleated sections is located between the pair of pleated sections.

16. The insect netting according to claim 1, wherein each of the side panels comprise an outermost pleated section and multiple intermediate pleated sections that are connected to each other along longitudinal inner edges of their gauze webs, wherein the outermost pleated section and the multiple intermediate pleated sections all have their front side merging into the front panel, wherein of each intermediate pleated section, the side gauze webs are connected to each other at an opposite back end, wherein the opposite back end of the outermost pleated section is configured to be located at or close to the hinging axis, and wherein the back ends of consecutive intermediate pleated sections are adjacent to and spread along the outermost pleated section.

17. A netting system for a greenhouse having a ventilation panel that is hingeable around a hinging axis, wherein the netting system comprises:

a framework configured for use with the ventilation panel; and an insect netting joined to the framework, wherein in an open position of the ventilation panel, the insect netting is configured to at least extend between an opening edge extending parallel to the hinging axis of the ventilation panel, and a ventilation panel edge extending parallel to the hinging axis of the ventilation panel, the insect netting comprising:

a front panel merging into two side panels, wherein the insect netting is pleated in a pleated configuration to collapse in a stacked manner, wherein the pleated configuration is formed with pleated sections comprising two parallel side pleated portions and a front pleated portion, wherein each of the side pleated portions comprises a first side gauze web and a second side gauze web connected to each other at a longitudinal side thereof and each having a first short side configured for facing towards the hinging axis, and a second short side, opposite to the first web end, configured for facing away from the hinging axis, wherein the front pleated portion comprises a first front gauze web and a second front gauze web connected to each other on a longitudinal side thereof, and wherein the second short side of the first and second side gauze webs of the side pleated portions is connected to the longitudinal side of the first and second front gauze webs facing towards the hinging axis of the ventilation panel, respectively.

18. The netting system according to 17, wherein the insect netting is secured to the framework by stitching.

19. A greenhouse, wherein the greenhouse comprises the roof construction having a slanting upper surface with an opening and the glass panel that covers the opening, wherein at its upper edge the glass panel is hingeably connected with a part of the roof construction to hinge around a hinging axis between a closed position in which the glass panel extends substantially parallel to the upper surface and an open position in which the glass panel is oriented oblique with respect to the upper surface to form a ventilation passage, wherein the greenhouse further comprises an insect netting according to claim 1.

20. A method for manufacturing pleated sections for an insect netting, wherein the insect netting is configured to be secured to a ventilation panel that is hingeable around a hinging axis, the method comprising:

providing two or more front gauze webs and two or more side gauze webs each side gauze web having a first short side configured for facing towards the hinging axis, and a second short side, opposite to the first short side, configured for facing away from the hinging axis;

connecting two side gauze webs to each other along a longitudinal side thereof;

connecting two front gauze webs to each other along a longitudinal side thereof; and securing the two connected side gauze webs to the two connected front gauze webs by arranging and connecting the second short side of the side gauze webs at and to the longitudinal side of the front gauze webs that is configured to face towards the hinging axis of the ventilation panel during use.

21. The method according to claim 20, wherein the side gauze webs are connected to the front gauze webs by welding, fusing or stitching.

\*  \*  \*  \*  \*